United States Patent
Smith et al.

(10) Patent No.: US 12,051,801 B1
(45) Date of Patent: Jul. 30, 2024

(54) LITHIUM AND ZINC ION BATTERY CONTAINING POLYETHYLENE OXIDE AND ACETATE LAYERED ELECTRODES

(71) Applicant: AEsir Technologies, Inc., Bozeman, MT (US)

(72) Inventors: Hannah S. Smith, Bozeman, MT (US); Melissa D. McIntyre, Butte, MT (US); Adam Weisenstein, Bozeman, MT (US)

(73) Assignee: AEsir Technologies, Inc., Bozeman, MT (US)

( * ) Notice: Subject to any disclaimer, the term of this patent is extended or adjusted under 35 U.S.C. 154(b) by 0 days.

(21) Appl. No.: 18/468,283

(22) Filed: Sep. 15, 2023

(51) Int. Cl.
| | |
|---|---|
| *H01M 4/38* | (2006.01) |
| *H01M 4/02* | (2006.01) |
| *H01M 4/36* | (2006.01) |
| *H01M 4/62* | (2006.01) |
| *H01M 10/38* | (2006.01) |
| *H01M 10/42* | (2006.01) |

(52) U.S. Cl.
CPC ............ *H01M 4/366* (2013.01); *H01M 4/38* (2013.01); *H01M 4/62* (2013.01); *H01M 10/38* (2013.01); *H01M 10/4235* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,553,584 | B2 | 6/2009 | Chiang et al. |
| 8,778,552 | B2 | 7/2014 | Chiang et al. |
| 9,583,779 | B2 | 2/2017 | Chiang et al. |
| 9,905,370 | B2 | 2/2018 | Tuqiang |
| 9,991,492 | B2 | 6/2018 | Roumi |
| 10,158,110 | B2 | 12/2018 | Roumi |
| 10,424,810 | B2 | 9/2019 | Pan et al. |
| 10,790,097 | B2 | 9/2020 | Makino et al. |
| 10,873,117 | B2 | 12/2020 | Hammond et al. |
| 11,251,417 | B2 | 2/2022 | Bai et al. |
| 11,342,582 | B2 | 5/2022 | Schuhmacher et al. |
| 2005/0079420 | A1* | 4/2005 | Cho ............... H01M 10/052 429/231.95 |
| 2010/0047671 | A1 | 2/2010 | Chiang et al. |
| 2011/0123850 | A1 | 5/2011 | Duong et al. |
| 2011/0123859 | A1 | 5/2011 | Huang et al. |

(Continued)

FOREIGN PATENT DOCUMENTS

| | | | |
|---|---|---|---|
| CN | 103682476 | * | 3/2014 |
| CN | 114976295 | * | 8/2022 |

(Continued)

OTHER PUBLICATIONS https://www.essentialchemicalindustry.org/polymers-an-overview.html "Polymers, An Overview" (Year: 2013).

*Primary Examiner* — Lisa S Park
(74) *Attorney, Agent, or Firm* — Brooks Kushman P.C.

(57) ABSTRACT

Layers including acetate doped polyethylene oxide adhered to the face of zinc negative electrodes or lithium intercalation positive electrodes are contemplated herein. These layers may penetrate into the surface of the electrode, partially filling the void space. A secondary battery may include some of the electrodes contemplated herein along with corresponding separator systems.

24 Claims, 3 Drawing Sheets

(56) References Cited

U.S. PATENT DOCUMENTS

| | | |
|---|---|---|
| 2011/0262803 A1 | 10/2011 | Huang et al. |
| 2011/0274948 A1 | 11/2011 | Duduta et al. |
| 2012/0189896 A1 | 7/2012 | Zhou et al. |
| 2013/0260207 A1* | 10/2013 | Uemura ............ H01M 10/4235 521/134 |
| 2019/0036147 A1 | 1/2019 | Yuan et al. |
| 2022/0293962 A1 | 9/2022 | Petrovic |
| 2023/0246171 A1* | 8/2023 | Jang ................ H01M 10/0565 429/215 |

FOREIGN PATENT DOCUMENTS

| | | |
|---|---|---|
| IN | 202041057521 | 11/2021 |
| WO | 2022221636 | 10/2022 |

* cited by examiner

LITHIUM AND ZINC ION BATTERY CONTAINING POLYETHYLENE OXIDE AND ACETATE LAYERED ELECTRODES

STATEMENT REGARDING FEDERALLY SPONSORED RESEARCH OR DEVELOPMENT

The invention was made with Government support under Award No. 2051693 from the National Science Foundation. The Government has certain rights to the invention.

TECHNICAL FIELD

This disclosure relates to electrodes for use in lithium and zinc-ion aqueous batteries.

BACKGROUND

A secondary cell may include an electrolyte, separator, anode, and cathode.

Chemical reactions of a secondary cell are reversible. When the cell is being charged for example, the anode may become positive, and the cathode may become negative. When the cell is being discharged, it behaves like a primary cell.

SUMMARY

An electrode assembly includes a porous lithium intercalation positive electrode, a polyethylene oxide polymer layer doped with lithium acetate and mechanically interlocked with the porous lithium intercalation positive electrode on opposite sides of the porous lithium intercalation positive electrode, and an acidic aqueous electrolyte saturating the porous lithium intercalation positive electrode and polyethylene oxide polymer layer.

An electrode assembly includes a zinc negative electrode, a polyethylene oxide polymer layer doped with zinc acetate and mechanically interlocked with the zinc negative electrode on opposite sides of the zinc negative electrode, and an acidic aqueous electrolyte saturating the polyethylene oxide polymer layer.

A secondary battery has a positive electrode including a porous lithium intercalation positive electrode, and a polyethylene oxide polymer layer doped with lithium acetate and mechanically interlocked with the porous lithium intercalation positive electrode on opposite sides of the lithium intercalation positive electrode. The secondary battery also has a negative electrode including a zinc negative electrode, and a polyethylene oxide polymer layer doped with zinc acetate and mechanically interlocked with the zinc negative electrode on opposite sides of the zinc negative electrode. The secondary battery further has an acidic aqueous electrolyte saturating the positive and negative electrodes, and a separator between the positive and negative electrodes.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Layers including acetate doped polyethylene oxide (PEO) adhered to the face of both zinc negative electrodes and lithium intercalation positive electrodes are contemplated. These layers may penetrate past the surface of a green 3D electrode, partially filling the void space. These layers improve cycle life by helping to control cation dis solution from the electrodes and may prevent incoming cation poisoning. The adhered layers will enhance electrolyte wetting as well as the mechanical stability of the electrodes. The adhered layers may also promote smooth zinc deposition on the zinc negative electrodes and improve the chemical stability of the electrodes by mitigating large pH shifts during cycling.

Figure 1:
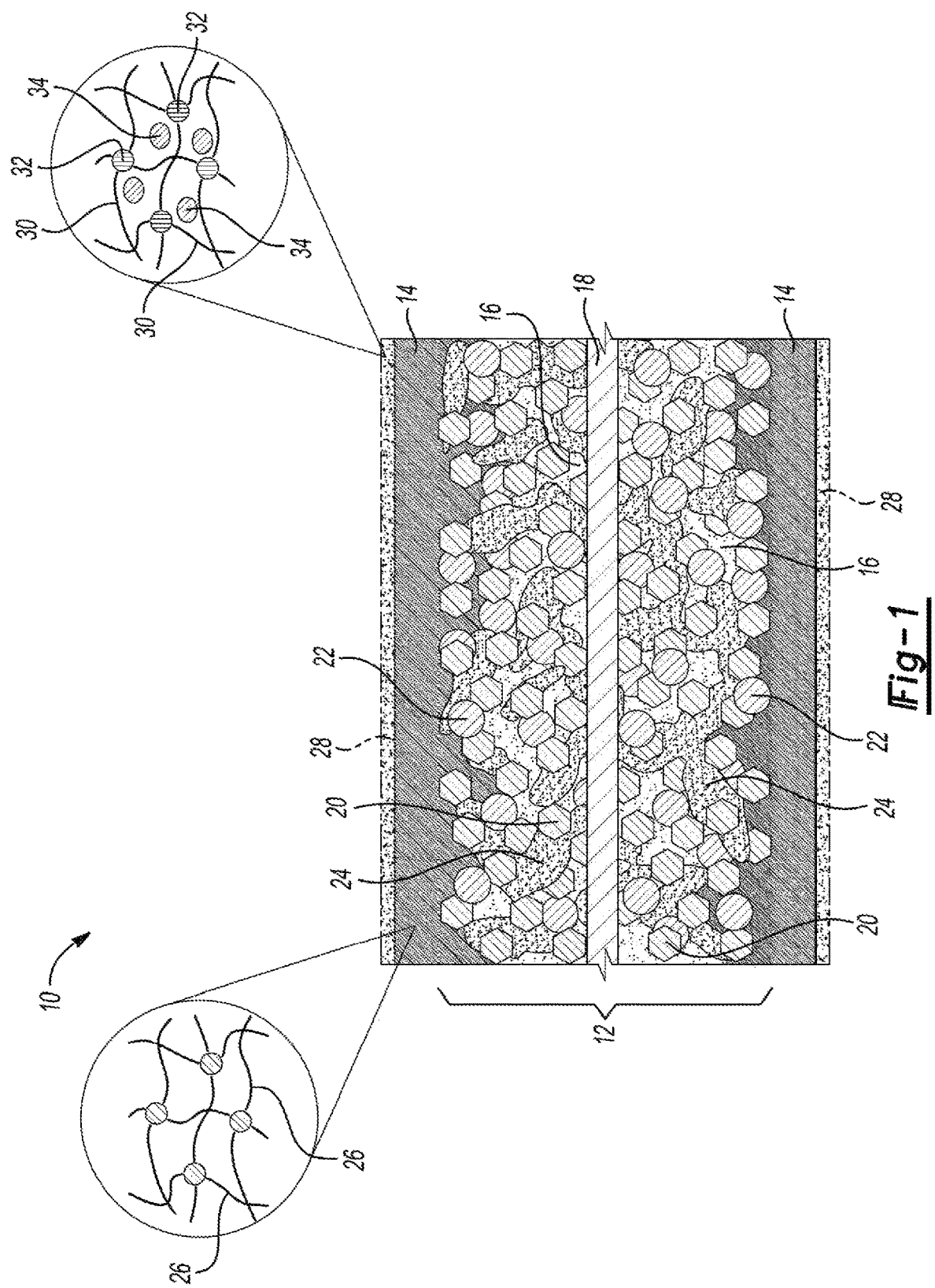
FIG. 1 is a side view, in cross-section, of a lithium intercalation electrode including an adhered layer partially infiltrated with polyethylene oxide (PEO) doped with lithium acetate.

Referring to FIG. 1, an electrode assembly 10 includes a porous lithium intercalation positive electrode 12, a polyethylene oxide polymer layer 14, which can be doped with lithium acetate, and an acidic aqueous electrolyte 16. The porous lithium intercalation positive electrode 12 includes, in this example, a current collector 18 and a porous mixture of lithium iron phosphate 20, conductive aid 22, and binder 24. The polyethylene oxide polymer layer 14 is amorphous. As such, void spaces of the porous mixture in a vicinity of the polyethylene oxide polymer layer 14 is at least partially occupied by material of the polyethylene oxide polymer layer 14 such that the polyethylene oxide polymer layer 14 penetrates into the void spaces without passing through the porous lithium intercalation positive electrode 12. The polyethylene oxide polymer layer 14 so arranged is mechanically adhered to the porous lithium intercalation positive electrode 12 on opposite sides thereof. Moreover, the current collector 18 is adhered to the mixture. The acidic aqueous electrolyte 16 fills void spaces of the porous mixture in a vicinity of the current collector 18 and saturates the polyethylene oxide polymer layer 14.

To maintain structural stability of the polyethylene oxide polymer layer 14 during cycling of the electrode assembly 10, polyethylene oxide polymers 26 of the polyethylene oxide polymer layer 14 can be cross linked.

In certain examples, the electrode assembly 10 may further include a polyvinyl alcohol layer 28 enveloping the polyethylene oxide polymer layer 14. As with the polyethylene oxide polymer layer 14, polyvinyl alcohols 30 of the polyvinyl alcohol layer 28 are cross linked to maintain structural stability of the polyvinyl alcohol layer 28 during cycling of the electrode assembly 10. Moreover, polymer cross-links 32 of the polyvinyl alcohol layer 28 can include a weak acid additive 34, such as boric acid or citric acid.

Figure 2:
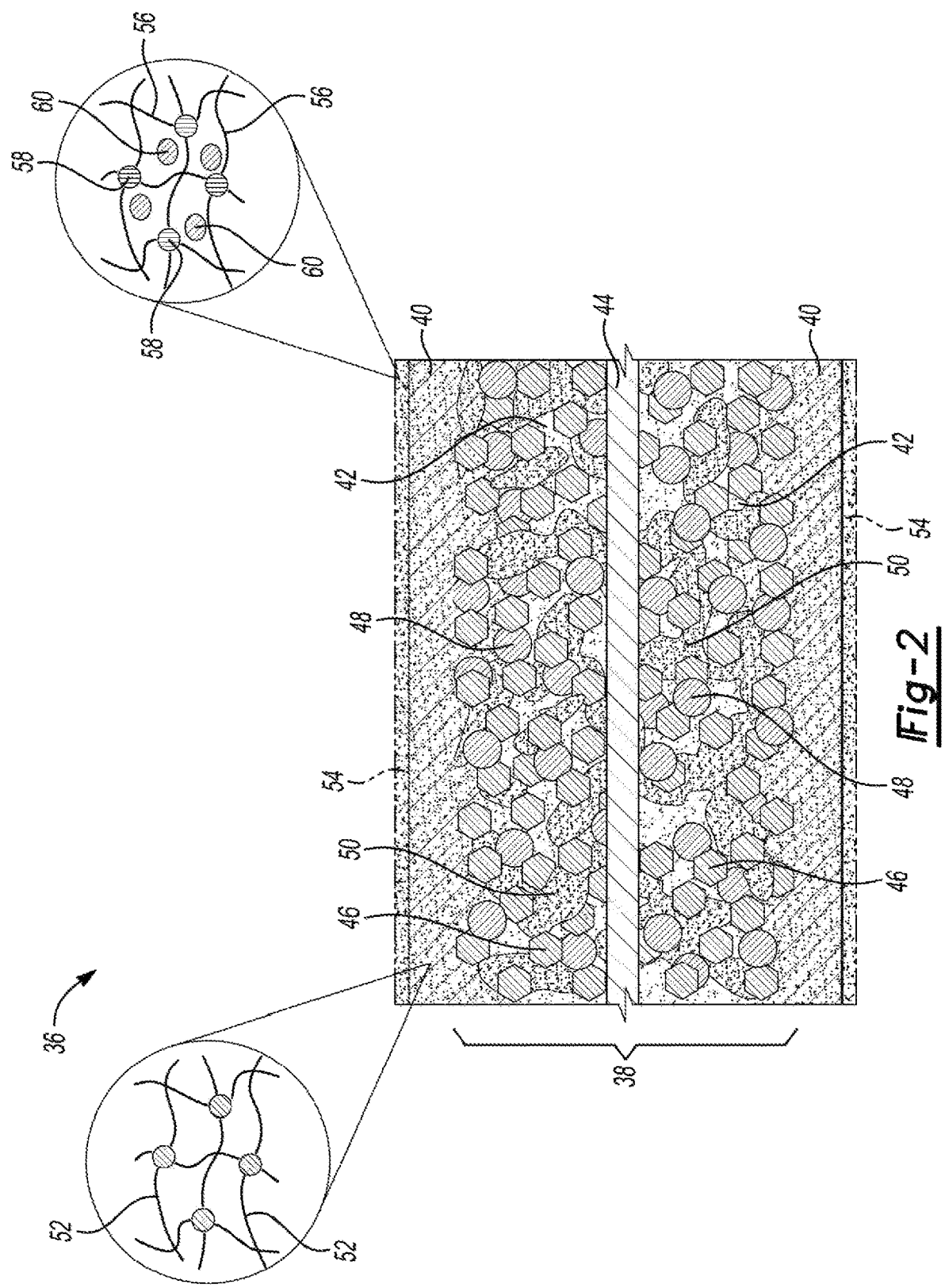
FIG. 2 is a side view, in cross-section, of a zinc electrode including an adhered layer partially infiltrated with PEO doped with zinc acetate.

Referring to FIG. 2, an electrode assembly 36 includes a zinc negative electrode 38, a polyethylene oxide polymer layer 40, which can be doped with zinc acetate, and an acidic aqueous electrolyte 42. The zinc negative electrode 38 includes, in this example, a current collector 44 and a porous mixture of zinc 46, conductive aid 48, and binder 50. The polyethylene oxide polymer layer 40 is amorphous. As such, void spaces of the porous mixture in a vicinity of the polyethylene oxide polymer layer 40 are at least partially occupied by material of the polyethylene oxide polymer layer 40 such that the polyethylene oxide polymer layer 40 penetrates into the void spaces without passing through the zinc negative electrode 38. The polyethylene oxide polymer layer 40 so arranged is mechanically adhered to the zinc negative electrode 38. Moreover, the current collector 44 is adhered to the mixture. The acidic aqueous electrolyte 42 fills void spaces of the porous mixture in a vicinity of the current collector 44 and saturates the polyethylene oxide polymer layer 40.

To maintain structural stability of the polyethylene oxide polymer layer 40 during cycling of the electrode assembly 36, polyethylene oxide polymers 52 of the polyethylene oxide polymer layer 40 can be cross linked.

In certain examples, the electrode assembly 36 may further include a polyvinyl alcohol layer 54 enveloping the polyethylene oxide polymer layer 40. As with the polyethylene oxide polymer layer 40, polyvinyl alcohols 56 of the polyvinyl alcohol layer 54 are cross linked to maintain structural stability of the polyvinyl alcohol layer 54 during cycling of the electrode assembly 36. Moreover, polymer cross-links 58 of the polyvinyl alcohol layer 54 can include a weak acid additive 60, such as boric acid or citric acid.

Figure 3:
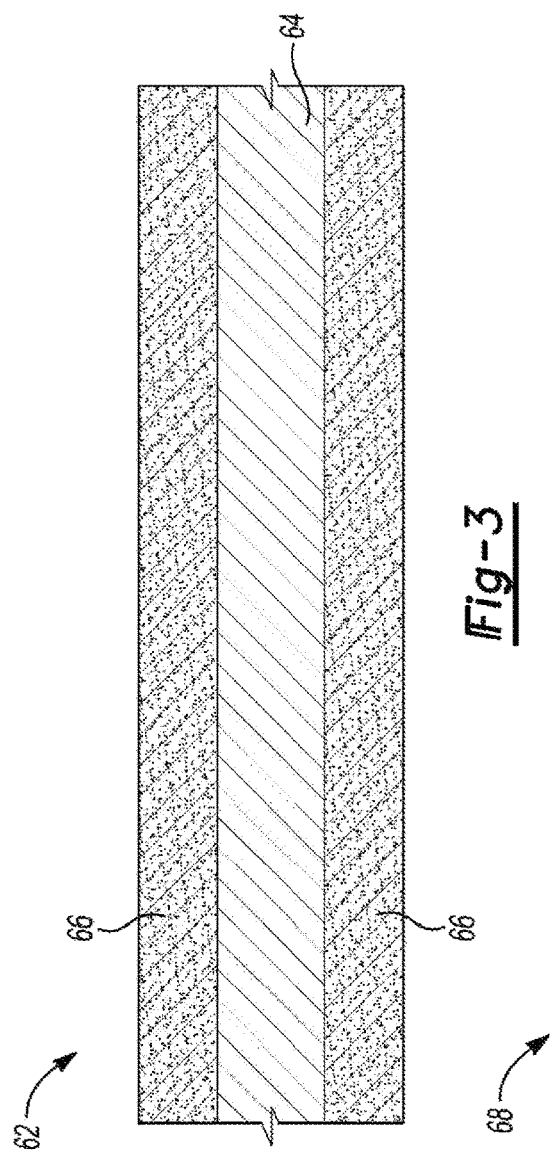
FIG. 3 is a side view, in cross-section, of a zinc foil electrode including an adhered layer of PEO doped with zinc acetate.

Referring to FIG. 3, a zinc electrode assembly 62 includes a zinc foil anode 64 with a polyethylene oxide polymer layer 66 doped with zinc acetate.

Figure 4:
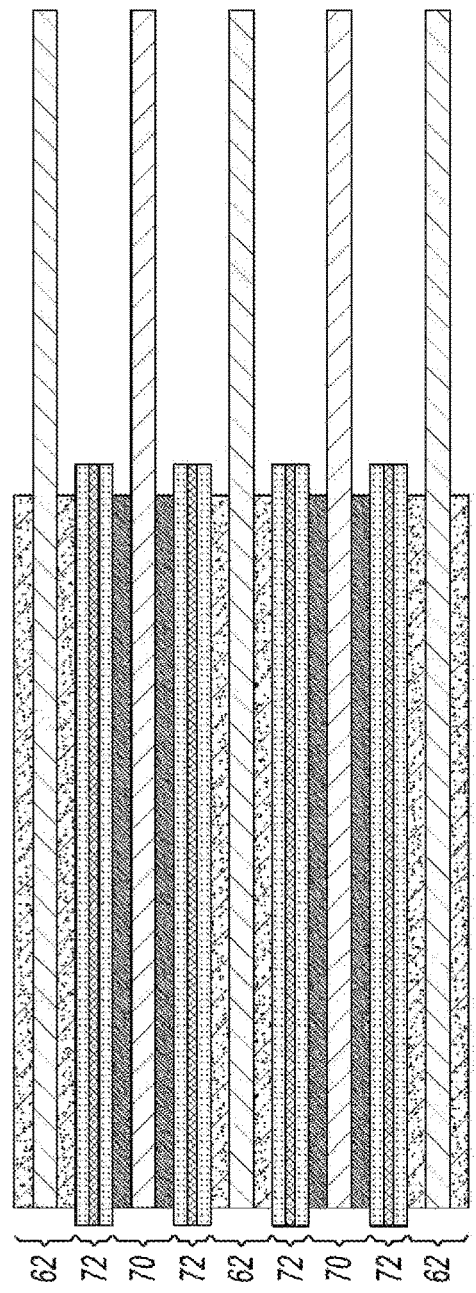
FIG. 4 is a side view, in cross-section, of a lithium and zinc ion battery containing electrodes including adhered surface layers of PEO doped with acetate.

Referring to FIG. 4, a lithium and zinc ion battery 68 includes a plurality of zinc electrode assemblies 62, a plurality of intercalation electrodes 70 similar to the electrode assemblies 10 of FIG. 1, and a plurality of separator systems 72 each serving as an electrolyte reservoir. Each of the intercalation electrodes 70 is sandwiched between a pair of the separator systems 72, which are in turn sandwiched between a pair of the zinc electrode assemblies 62.

While exemplary embodiments are described above, it is not intended that these embodiments describe all possible forms encompassed by the claims. For example, the lithium intercalation material can be, but not limited to, olivine structures, spinel structures, lithium oxides including cobalt, nickel, vanadium, manganese, and/or aluminum, and Prussian blue analogs.

The words used in the specification are words of description rather than limitation, and it is understood that various changes may be made without departing from the spirit and scope of these disclosed materials.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrode assembly comprising:
  a porous lithium intercalation positive electrode;
  a polyethylene oxide polymer layer doped with lithium acetate and mechanically interlocked with the porous lithium intercalation positive electrode on opposite sides of the porous lithium intercalation positive electrode; and
  an acidic aqueous electrolyte saturating the porous lithium intercalation positive electrode and polyethylene oxide polymer layer.

2. The electrode assembly of claim 1, wherein the polyethylene oxide polymer layer penetrates into void spaces of the porous lithium intercalation positive electrode without passing through the porous lithium intercalation positive electrode.

3. The electrode assembly of claim 1, wherein polyethylene oxide polymers of the polyethylene oxide polymer layer are cross-linked.

4. The electrode assembly of claim 1 further comprising a polyvinyl alcohol layer enveloping the polyethylene oxide polymer layer.

5. The electrode assembly of claim 4, wherein polyvinyl alcohols of the polyvinyl alcohol layer are cross-linked.

6. The electrode assembly of claim 5, wherein polymer cross-links of the polyvinyl alcohol layer include a weak acid additive.

7. The electrode assembly of claim 6, wherein the weak acid additive is boric acid.

8. The electrode assembly of claim 6, wherein the weak acid additive is citric acid.

9. The electrode assembly of claim 1 further comprising a current collector adhered to and disposed within the porous lithium intercalating positive electrode.

10. An electrode assembly comprising:
  a zinc negative electrode;
  a polyethylene oxide polymer layer doped with zinc acetate and mechanically interlocked with the zinc negative electrode on opposite sides of the zinc negative electrode; and
  an acidic aqueous electrolyte saturating the polyethylene oxide polymer layer.

11. The electrode assembly of claim 10, wherein the zinc negative electrode is a porous zinc negative electrode and wherein the polyethylene oxide polymer layer penetrates into void spaces of the porous zinc negative electrode without passing through the porous zinc negative electrode.

12. The electrode assembly of claim 10 further comprising a polyvinyl alcohol layer enveloping the polyethylene oxide polymer layer.

13. The electrode assembly of claim 12, wherein polyvinyl alcohols of the polyvinyl alcohol layer are cross-linked.

14. The electrode assembly of claim 13, wherein polymer cross-links of the polyvinyl alcohol layer include a weak acid additive.

15. The electrode assembly of claim 14, wherein the weak acid additive is boric acid.

16. The electrode assembly of claim 14, wherein the weak acid additive is citric acid.

17. The electrode assembly of claim 10, wherein the zinc negative electrode is a zinc foil negative electrode.

18. The electrode assembly of claim 10 further comprising a current collector adhered to and disposed within the zinc negative electrode.

19. A secondary battery comprising:
- a positive electrode including a porous lithium intercalation positive electrode, and a polyethylene oxide polymer layer doped with lithium acetate and mechanically interlocked with the porous lithium intercalation positive electrode on opposite sides of the lithium intercalation positive electrode;
- a negative electrode including a zinc negative electrode, and a polyethylene oxide polymer layer doped with zinc acetate and mechanically interlocked with the zinc negative electrode on opposite sides of the zinc negative electrode;
- an acidic aqueous electrolyte saturating the positive and negative electrodes; and
- a separator between the positive and negative electrodes.

20. The secondary battery of claim 19, wherein the polyethylene oxide polymer layer doped with lithium acetate penetrates into void spaces of the porous lithium intercalation positive electrode without passing through the porous lithium intercalation positive electrode.

21. The secondary battery of claim 19, wherein the zinc negative electrode is a porous zinc negative electrode and wherein the polyethylene oxide polymer layer doped with zinc acetate penetrates into void spaces of the porous zinc negative electrode without passing through the porous zinc negative electrode.

22. The secondary battery of claim 19, wherein polyethylene oxide polymers of the polyethylene oxide polymer layer are cross-linked.

23. The secondary battery of claim 19 further comprising respective polyvinyl alcohol layers enveloping the polyethylene oxide polymer layer, wherein polyvinyl alcohols of the polyvinyl alcohol layers are cross-linked.

24. The secondary battery of claim 19, wherein the zinc negative electrode is a zinc foil negative electrode.

\* \* \* \* \*